United States Patent Office 3,407,195
Patented Oct. 22, 1968

3,407,195
4-METHYL-1-(5-NITROFURFURYLIDENEAMINO)-
2-IMIDAZOLIDINONE
Harry Raymond Snyder, Jr., Norwich, N.Y., assignor to
The Norwich Pharmacal Company, a corporation of
New York
No Drawing. Filed Apr. 3, 1967, Ser. No. 627,605
1 Claim. (Cl. 260—240)

ABSTRACT OF THE DISCLOSURE

A novel nitrofuran, 4 - methyl-1-(5-nitrofurfurylidene-amino)-2-imidazolidinone, possesses a high order of antimicrobial potency and is particularly noteworthy as a urinary tract antibacterial agent.

This invention relates to a chemical compound, 4-methyl - 1-(5-nitrofurfurylideneamino)-2-imidazolidinone, of the formula:

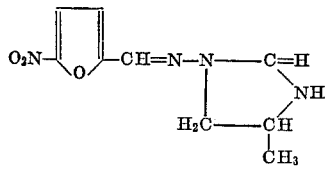

and a method for its preparation.

This compound, in common with many nitrofurans, possesses a high order of antibacterial activity effecting inhibition of the growth of gram-negative and gram-positive organisms in small amounts in the order of 0.75-25 ug./ml. It is thus adapted to be combined with various carriers and excipients of the pharmaceutical art to provide compositions inimical to the propagation of unwanted bacterial contamination. In this application various forms, such as elixirs, dusts, suspensions, solutions, ointments, tablets, and the like, are suitable.

The compound of this invention also has value in the treatment of systemic infection provoked by *Staphylococcus aureus*. When administered perorally in a dose of 100 mg./kg. to mice lethally infected with the aforesaid bacterium a 90% survival is secured. In its vivo capacities extend, furthermore, to other infections such as *Salmonella typhosa*, where 100 mg./kg. per os to mice lethally infected thereby achieves 50% survival; *Escherichia coli*, where 100 mg./kg. per os to mice lethally infected thereby allows 90% survival; and in various diseases of poultry provoked by *Eimeria tenella* or *Salmonella gallinarum*, where administration of it via the feed supply, at a level of about 0.022% by weight thereof, prevents morbidity and mortality.

A distinguishing feature of this compound is its behavior in the course of metabolism in the host to whom it is administered. It has been found under such circumstances that a highly antibacterially effective portion, in the neighborhood of 15% of the dose, appears in the urine of subjects, such as dogs, to whom it is administered.

By virtue of providing urine of high antibacterial efficiency, this compound is peculiarly suited for combatting urinary tract infection.

To provide readily administered dosage forms the compound of this invention is readily composed as tablets, capsules, suspensions and the like using adjuvants and excipients common to the apothecary art.

In order that the compound of this invention my be readily available to those skilled in the art, the now preferred method for its preparation is set forth:

To 4-methyl-2-imidazolidinone (73.0 g., 0.73 mole) (J. Chem. Soc., 1929, 2621) dissolved in 2 N sulfuric acid (2000 ml.) at 5° C. was added over 15 minutes sodium nitrite (50.5 g., 0.73 mole) while keeping the temperature at 5–6° C. After stirring at 5° C. for 1.25 hours, zinc dust (110 g., 1.68 moles) was added over one hour at <20° C. The mixture was stirred for thirty minutes with ice bath cooling and then for an hour at room temperature. The reaction mixture was filtered. A solution of 5-nitrofurfuryl (93.0 g., 0.66 mole) in alcohol (700 ml.) was added to the filtrate. After chilling, the product was collected and washed with water. After drying at 60 C., the material weighed 130 g. (82.7%), M.P. 220–230° C. dec.

The crude product was recrystallized from nitromethane to give 100 g., M.P. 237.5–239.5° C. dec. (corr.). A second recrystallization from nitromethane gave 95.6 g., M.P. 240–240.5° C. dec. (corr.).

*Analysis.*—Calcd. for $C_9H_{10}N_4O_4$: C, 45.38; H, 4.23; N, 23.52. Found: C, 45.35; H, 4.09; N, 23.52.

What is claimed is:
1. The compound 4 - methyl-1-(5-nitrofurfurylidene-amino)-2-imidazolidinone of the formula:

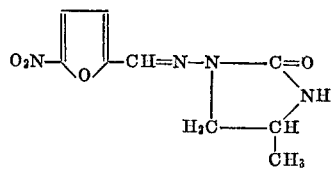

References Cited

UNITED STATES PATENTS

| | | | |
|---|---|---|---|
| 2,746,960 | 5/1956 | Gever et al. | 260—240 |
| 2,776,979 | 1/1957 | Michels | 260—240 |
| 2,830,046 | 4/1958 | Hayes | 260—240 |

JOHN D. RANDOLPH, *Primary Examiner.*

UNITED STATES PATENT OFFICE
CERTIFICATE OF CORRECTION

Patent No. 3,407,195                                                October 22, 1968

Harry Raymond Snyder, Jr.

It is certified that error appears in the above identified patent and that said Letters Patent are hereby corrected as shown below:

Column 1, lines 21 to 28, the formula should appear as shown below:

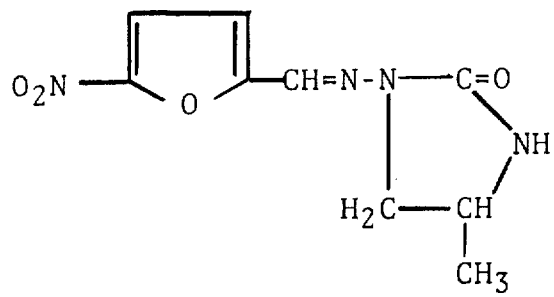

same column 1, line 44, "In its" should read -- Its in --.
Column 2, line 25, "nitrofurfuryl" should read -- nitrofurfural --; line 27, "60 C." should read -- 60° C. --.

Signed and sealed this 3rd day of March 1970.

(SEAL)
Attest:

EDWARD M. FLETCHER, JR.                        WILLIAM E. SCHUYLER, JR.
Attesting Officer                                Commissioner of Patents